United States Patent [19]
Summers

[11] Patent Number: 6,111,571
[45] Date of Patent: Aug. 29, 2000

[54] METHOD AND COMPUTER PROGRAM FOR OPERATING AN INTERACTIVE THEMED ATTRACTION ACCESSIBLE BY COMPUTER USERS

[75] Inventor: Monty Summers, Lee's Summit, Mo.

[73] Assignee: Full Moon Productions, Inc., Kansas City, Mo.

[21] Appl. No.: 09/164,660

[22] Filed: Oct. 1, 1998

[51] Int. Cl.⁷ ...................................................... G06F 13/00
[52] U.S. Cl. ........................... 345/329; 345/302; 709/224
[58] Field of Search ............................. 370/468; 345/419, 345/8, 327, 329, 302; 713/201; 348/7; 709/224, 226, 221

[56] References Cited

U.S. PATENT DOCUMENTS

| | | | |
|---|---|---|---|
| 5,414,455 | 5/1995 | Hooper | 348/7 |
| 5,583,561 | 12/1996 | Baker et al. | 370/468 |
| 5,671,225 | 9/1997 | Hooper | 348/7 |
| 5,772,213 | 6/1998 | McGlew | 273/308 |
| 5,807,174 | 9/1998 | Fukuhara | 463/31 |
| 5,844,530 | 12/1998 | Tosaki | 345/8 |
| 5,850,352 | 12/1998 | Moezzi | 345/419 |
| 5,987,611 | 11/1999 | Freund | 713/201 |

*Primary Examiner*—Zarni Maung
*Assistant Examiner*—Khanh Quang Dinh
*Attorney, Agent, or Firm*—Hovey, Williams, Timmons & Collins

[57] ABSTRACT

A method and computer program for operating an interactive themed attraction (12) accessible by computer users (16) is disclosed. The method includes the steps of videotaping at least a portion of a themed attraction to create a video file; storing the video file in a computer-readable memory device accessible by a host computer (14); permitting computer users to access the host computer via a communication network (18) to view the video file; receiving at the host computer a request from one or more of the computer users to interact with the themed attraction; and controlling at least one controllable feature (20) of the themed attraction in response to the request so that the computer users can interact with the themed attraction via the communication network.

14 Claims, 2 Drawing Sheets

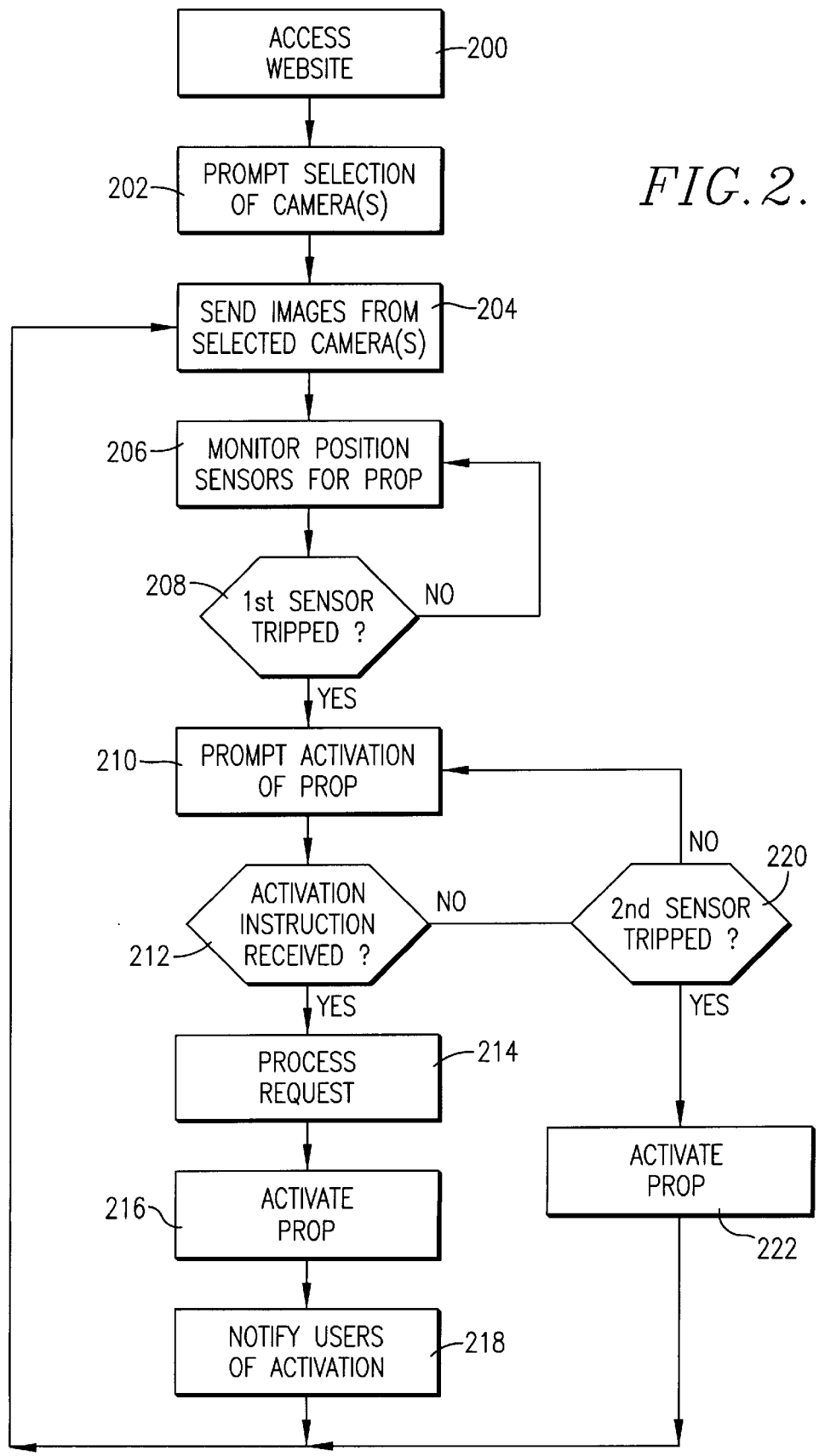

METHOD AND COMPUTER PROGRAM FOR OPERATING AN INTERACTIVE THEMED ATTRACTION ACCESSIBLE BY COMPUTER USERS

BACKGROUND OF THE INVENTION

1. Field of the Invention

The present invention relates to a method and computer program for operating an interactive themed attraction such as a haunted house that can be accessed and viewed by computer users via a communication network such as the Internet. More particularly, the invention relates to a method and computer program that allows computer users to access a host computer via a communication network, view live or pre-recorded video and audio files of a themed attraction as customers walk therethrough, and control certain aspects of the themed attraction so that they can interact with the attraction and influence the material that is taped and sent to their computers.

2. Description of the Prior Art

The explosive growth of the Internet and the ever-increasing number of websites has created a new entertainment medium for computer users. Unfortunately, however, most entertainment-related websites contain pornography or other content not suitable for children. Thus, a need exists for a website that has fun and exciting family-oriented content.

Another limitation of most Internet websites is that they contain only passive material that cannot be interacted with or manipulated by users who access the sites. After users visit these sites a few times, the content becomes "stale" and the sites become less interesting. Thus, a need exists for a website that has fun and interactive content and that allows Internet users to actively participate in and influence the material that is delivered to their Internet browsers.

OBJECTS AND SUMMARY OF THE INVENTION

The present invention solves the above described problems and provides a distinct advance in the art. Particularly, the invention provides a method and computer program for operating an interactive themed attraction accessible by computer users that provides an alternative to the above-described adult-oriented and passive websites.

The method of the present invention broadly includes the steps of videotaping at least a portion of a themed attraction to create a video and audio file; storing the video and audio file in a computer-readable memory device accessible by a host computer; permitting computer users to access the host computer via a communication network to view the video and audio file; receiving at the host computer a request from one or more of the computer users to interact with the themed attraction; and controlling at least one controllable feature of the themed attraction in response to the request so that the computer users can interact with the themed attraction via the communication network.

In preferred forms, the themed attraction is a haunted house that includes a plurality of controllable props that can be triggered to scare customers as they walk through the haunted house. As the customers approach the props, the computer users are given the opportunity to trigger the props. This allows the computer users to not only access the host computer and view the haunted house as if they were actually there, but to also participate in the operation of the haunted house and to immediately see the effects of the props on the customers as the props are triggered. Thus, the present invention allows Internet users to actively participate in and influence the material that is delivered to their Internet browsers.

In one embodiment of the invention, a customer or employee of the haunted house videotapes the entire haunted house with a portable camera as he or she walks therethrough. The camera may be mounted directly to the person, such as on a helmet worn by the person, or may be merely carried by the person. The video and audio files captured by the camera are then stored in memory associated with the host computer so that computer users may access the host computer via the Internet or other communication network and view the video and audio files in real time as the person walks through the haunted house.

The computer program of the present invention has the capability to receive requests to trigger the props from multiple computer users and to determine which of the users gets to actually control the props. The computer program also has the capability to monitor the status of the props and to automatically trigger them at the optimum moment if none of the computer users trigger the props within a certain time.

In addition to the live transmission of video and audio files, pre-recorded video and audio files of popular scenes in the haunted house and of funny reactions of customers may be stored on the host computer for repeated access by the computer users.

BRIEF DESCRIPTION OF THE DRAWING FIGURES

A preferred embodiment of the present invention is described in detail below with reference to the attached drawing figures, wherein:

FIG. 1 is a schematic diagram illustrating computer components and portions of a themed attraction that may be used in connection with the method and computer program of the present invention; and FIG. 2 is a flow diagram broadly illustrating certain steps performed by the computer program of the present invention.

DETAILED DESCRIPTION OF THE PREFERRED EMBODIMENTS

Figure 1:
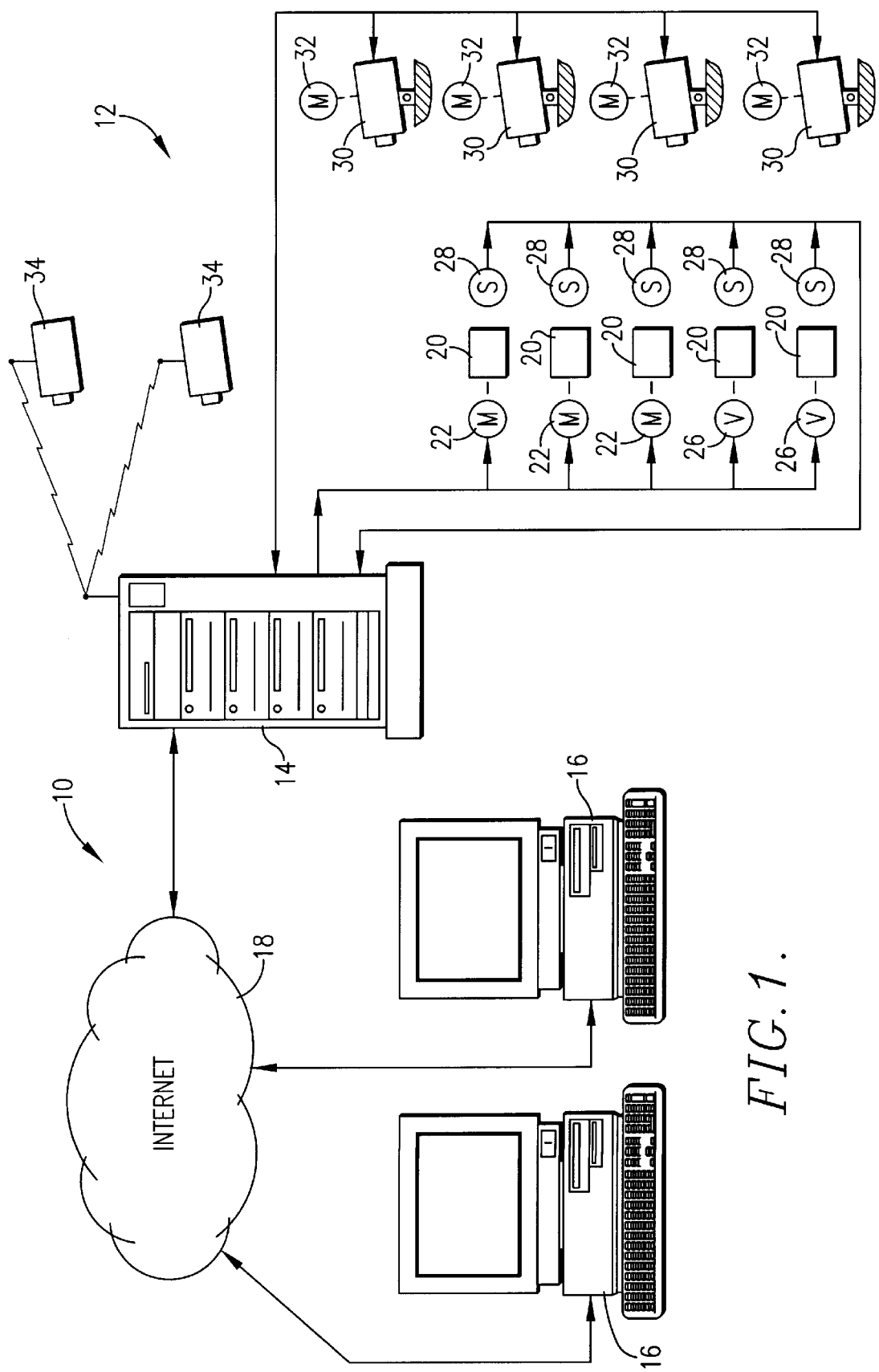

Turning now to the drawing figures, FIG. 1 illustrates components that may be used in connection with the method and computer program of the present invention. The components broadly include a computer network referred to by the numeral 10 and equipment in a themed attraction referred to by the numeral 12.

In more detail, the computer network 10 includes a host computer 14 connected to a plurality of user computers 16 by a communication network 18. The host computer may be any type of commercially-available network computer such as those manufactured by IBM, Hewlett Packard, Dell, or other equivalent company. The host computer may be owned and operated by the operator of the themed attraction or by an Internet service provider that provides web hosting services for the themed attraction. The user computers are preferably commercially-available personal computers owned by users who wish to access the host computer.

The host computer 14 and user computers 16 preferably communicate via the Internet; however, the communication network 18 may also be a privately owned and operated LAN or any other conventional network. The host computer is preferably connected to the communication network by one or more ISDN lines or other high-speed connections. Likewise, the user computers are preferably connected to the communication network by ISDN lines or other high-speed connections, but may also be connected by high-speed modems.

The themed attraction 12 may be any type of themed, theatrical or dramatical event such as a haunted house, Christmas or other holiday production, play, or any other festive or interactive entertainment activity. In preferred forms, the themed attraction is one or both of the haunted houses known as The Beast and The Edge of Hell operated by Full Moon Productions, Inc., of Kansas City, Mo.

As illustrated in FIG. 1, the themed attraction 12 includes, among other components, a plurality of controllable props 20 dispersed throughout various scenes of the attraction. The props are each coupled with an electrical or pneumatic motor or cylinder 22 that can be operated to trigger its respective prop to scare customers as they walk thereby. For example, the props may include a movable alligator and a moveable wolf that may be raised or extended and a floor that can be dropped as customers walk thereon. The props may also include a plurality of air cannons connected to pneumatic valves 26 that can be triggered to fire bursts of pressurized air at customers as they walk thereby. All of the motors, cylinders, and valves that trigger the props are connected to suitable sources of electrical power and/or pressurized air and are connected to and controlled by the host computer 14. As described in detail below, the props can be remotely triggered by the users of the computers 16.

The themed attraction also preferably includes a plurality of position sensors 28 located near the props 20 for monitoring the position of customers as they approach each of the props. The position sensors are also coupled with the host computer 14 for providing inputs to the computer program described below. Each prop is preferably associated with a first position sensor that signals the host computer when customers are a first distance from the prop and a second position sensor that signals the host computer when customers are a second, closer distance from the prop. For example, the first position sensor for a prop may be located so that it is activated by a customer when he or she is approximately six feet away from the prop, and the second position sensor may be located so that it is activated when the customer is approximately three feet away from the prop. The position sensors may be infrared transmitter and receiver devices, proximity switches, load cells, or any other conventional position detectors.

The themed attraction also includes a plurality of cameras 30 that are dispersed throughout the scenes of the themed attraction for filming the attraction and its customers as the customers walk therethrough. In preferred forms, several cameras are mounted to the walls, ceiling, or floor of each scene or room of the attraction. The cameras may be coupled with servo motors 32 or other positioning devices so that they can be selectively moved to capture different images. As with the props 20, the cameras are connected to suitable sources of power and are connected to the host computer 14 so that they transmit video and audio files to the host computer and receive control signals from the host computers. Some or all of the cameras may be infrared-type cameras to more effectively capture video images in dark rooms. The present invention may also utilize one or more portable cameras 34 that send video and audio files to the host computer via a wireless connection such as radio frequency waves.

To implement the method of the present invention, at least a portion of the themed attraction is videotaped with the cameras 30,34 to create video and audio files. For example, the fixed cameras 30 associated with each of the scenes can be operated to videotape customers as they walk through the scenes. Also, the portable cameras 34 can be operated by a customer or employee of the themed attraction to videotape the entire themed attraction as he or she walks therethrough. The portable cameras may be mounted directly to the persons, such as on helmets worn by the persons, or may be merely carried.

Customers and employees will likely videotape the themed attraction from different perspectives, therefore, it may be desirable to have both customers and employees carry the portable cameras 34. For example, customers will not know where the props and other scary scenes are located and are therefore more likely to be scared by the props and to react in an unexpected manner. Video and audio files captured from a customer's perspective will therefore be similar to those that persons would experience if they had actually walked through the themed attraction themselves. In contrast, employees of the themed attraction will know where the props are and can aim the cameras at the props to more clearly film the operation of the props. However, the employees will likely not be scared by the props and therefore will not react the same way that customers would.

The video and audio files taken by the cameras 30,34 are transferred to and stored in memory accessible by the host computer 14. Computer users operating the user computers 16 may then access the host computer via the Internet or other communication network 18 and view the video and audio files in real time as the video and audio files are being created.

The computer program of the present invention operates the host computer 14 to control the access to the host computer and to operate the cameras and props. As illustrated in the flow diagram of FIG. 2, the computer program includes code structure depicted by the step 200 that permits the user computers 16 to access the host computer 14 via the communications network 18. The code structure may require conventional log-in procedures and may require the entry of a credit card number to collect a user fee to access the site. Alternatively, the access may be free of charge, but advertising may be displayed during the log-in procedures.

The program may then prompt the computer user to select which camera or cameras to receive video and audio files from as depicted by the step 202. For example, the program may allow the users to select from video and audio files from various scenes within the themed attraction or video and audio files created by the portable cameras 34. To minimize the size of the video and audio files transmitted by the host computer 14, the host computer may only transmit files from one or a few cameras at a time. If multiple requests are received for different cameras, the computer program may select the camera or cameras based on a voting and "majority rules" basis. Once the camera or cameras are selected, the code structure depicted in step 204 accesses the selected video and audio files and transmits them to one or more of the user computers 16 via the communication network 18.

During the taping of the attraction and while customers walk therethrough, the computer program monitors the position sensors 28 for each of the props 20 as depicted in step 206 and gives the computer users the opportunity to trigger the props to scare customers as they approach the props. This allows the computer users to not only view the attraction as if they were actually there, but to also participate in the operation of the attraction and to immediately see the effects of the props on the customers as the props are triggered. Specifically, when the program senses that the first position sensor for a prop is activated as depicted in step 208, it proceeds to step 210 to prompt the computer users to activate the prop. The prompt may be in the form of a green indicator light transmitted to the user computers 16 that prompts the users to touch a key or the space bar of their computer keyboard to trigger the prop or may be an icon that can be clicked on to activate the prop.

Step 212 of the computer program then determines if one or more of the computer users responded to the prompt by transmitting a request to the host computer 14 to trigger the prop. If a request was received, step 214 then processes the request. The processing may include the step of determining which computer user requested to trigger the prop at the optimum time or may include the step of randomly selecting one of the requests. The computer program then activates the prop in response to one or more of the requests by the computer users as depicted in step 216 and notifies the users of the activation as depicted in step 218.

The computer program also has the capability to automatically trigger the props 20 at the optimum moment if none of the computer users trigger the prop within a certain time. Specifically, if the computer program in step 212 determines that none of the computer users requested activation of the prop after the first position sensor was tripped, the program continues to monitor the activation of the second sensor and continues to prompt the computer users to activate the prop as depicted in steps 220 and 210. If the second sensor is tripped before any of the users request that the prop be activated, the computer program automatically activates the prop as depicted in step 222. This provides the computer users with the opportunity to trigger the prop, and also ensures that the prop is triggered at the optimum moment even if none of the computer users transmit such a request to the host computer.

In addition to the live transmission of video and audio files, pre-recorded video and audio files of popular scenes in the haunted house and of funny reactions of customers may be stored on the host computer for repeated access by the computer users. These pre-recorded video and audio files may also be transmitted to the computer users as "simulated live" files. For example, the computer users may be prompted to trigger the props when the pre-recorded video shows that the customers are approaching the props. If the computer users actually do request to trigger the props, they believe that they controlled the activation of the props even though the video images were actually pre-recorded.

The host computer may also store other information and include other features related to the themed attraction such as allowing computer users to purchase tickets and merchandise or obtain other information about the attraction.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

What is claimed is:

1. A method of operating an interactive themed attraction that includes at least one controllable prop and that can be accessed by computer users over a communication network, the method comprising the steps of:

video recording at least a portion of the themed attraction including the prop to create a video file;

at least temporarily storing the video file in a computer-readable memory device accessible by a host computer;

permitting computer users to access the host computer via the communication network to view the video file in substantially real-time as the video file is being created;

receiving at the host computer a request from one or more of the computer users to interact with the themed attraction; and in response to the request, controlling operation of the prop as the prop is being video recorded so that one or more of the computer users can control operation of the prop during the video recording and therefore control content of the video file to interact with the themed attraction via the communication network.

2. The method as set forth in claim 1, wherein the videotaping step includes videotaping different portions of the themed attraction with a plurality of cameras that each create a separate video file, the request being a request to select which video file to be viewed.

3. The method as set forth in claim 2, further including the steps of monitoring a first status condition relating to the prop, that if met, means that the prop should soon be operated, and signaling the computer users, via the communication network, to trigger the prop when the first status condition is met.

4. The method as set forth in claim 3, further including the steps of monitoring a second status condition relating to the prop, that if met, means that the prop should be immediately operated, and automatically operating the prop when the second status condition is met if none of the computer users request to operate the prop after the first status condition is met.

5. The method as set forth in claim 3, the first status condition including determining if a customer of the themed attraction passes a location a first distance from the prop.

6. The method as set forth in claim 4, the second status condition including determining if a customer of the themed attraction passes a location a second distance from the prop.

7. The method as set forth in claim 1, wherein the computer users view the video file in approximately real-time.

8. The method as set forth in claim 1, the communication network being the Internet.

9. The method as set forth in claim 1, the themed attraction being a haunted house.

10. The method as set forth in claim 9, the prop being a movable device that can be triggered to scare customers of the haunted house as they walk thereby.

11. A computer program embodied on a computer-readable medium for operating a host computer that can be accessed by computer users over a communication network, the computer program comprising:

a code segment for permitting computer users to access the host computer via the communication network;

a code segment for accessing a computer-readable memory device accessible by the host computer to retrieve a video file that includes video images that are created in essentially real-time by video recording a portion of a themed attraction including a controllable prop;

a code segment for transmitting the video file to the computer users for viewing;

a code segment for receiving at the host computer a request from one or more of the computer users to interact with the themed attraction; and a code segment for, in response to the request, controlling operation of the prop as the prop is being video recorded so that one or more of the computer users can control the prop during the video recording and therefore control content of the video file to interact with the themed attraction via the communication network.

12. The computer program as set forth in claim 11, wherein a plurality of video files created by a plurality of cameras are stored on the computer-readable memory device, the request being a request to select which video file to be viewed.

13. The computer program as set forth in claim 11, further including a code segment for monitoring a first status condition relating to the prop, that if met, means that the prop should soon be operated, and a code segment for signaling the computer users, via the communication network, to trigger the prop when the first status condition is met.

14. The computer program as set forth in claim 13, further including a code segment for monitoring a second status condition relating to the prop, that if met, means that the prop should be immediately operated, and a code segment for automatically operating the prop when the second status condition is met if none of the computer users request to operate the prop after the first status condition is met.

* * * * *